United States Patent [19]

Tsao et al.

[11] 4,154,872

[45] May 15, 1979

[54] PROCESS FOR PREPARING CATALYTIC SOLUTIONS OF SULFONIUM SALTS

[75] Inventors: Jung-Hsien Tsao; Arthur D. Ketley, both of Columbia, Md.

[73] Assignee: W. R. Grace & Co., New York, N.Y.

[21] Appl. No.: 904,158

[22] Filed: May 9, 1978

[51] Int. Cl.$^2$ ............................ C08F 2/46; C08F 4/00
[52] U.S. Cl. ................................... 427/44; 96/115 P; 204/159.11; 204/159.15; 204/159.18; 204/159.23; 204/159.24; 260/30.4 EP; 260/33.4 EP; 260/830 R; 260/836; 260/837 R; 427/54; 427/372 R; 427/386; 528/90; 528/110; 528/116; 528/354; 528/366; 528/408; 528/409; 528/421
[58] Field of Search ................ 427/44, 54; 260/607 B; 204/159.11, 159.18, 159.23, 159.24; 96/115 P, 115 R

[56] References Cited

U.S. PATENT DOCUMENTS

| 4,026,705 | 5/1977 | Crivello | 96/27 R |
| 4,054,498 | 10/1977 | Tarwid | 204/159.11 |
| 4,069,056 | 1/1978 | Crivello | 96/115 P |
| 4,080,274 | 3/1978 | Schlesinger | 204/159.18 |
| 4,108,747 | 8/1978 | Crivello | 204/159.18 |

Primary Examiner—Richard B. Turer
Attorney, Agent, or Firm—Richard P. Plunkett; William W. McDowell, Jr.

[57] ABSTRACT

This invention relates to a process for preparing a catalytic solution of a sulfonium salt of a complex anion, capable of yielding a Lewis Acid when irradiated by UV or high energy ionizing radiation comprising reacting a sulfonium halide with an alkali metal salt of the complex anion in a solvent mixture containing a polyol having at least two hydroxy groups and a lactone.

11 Claims, No Drawings

PROCESS FOR PREPARING CATALYTIC SOLUTIONS OF SULFONIUM SALTS

The present invention relates to a process for preparing a solution of a triphenyl sulfonium salt that is useful for the photopolymerization of cationically initiated monomers and resins.

Epoxy resins are generally employed in applications requiring high performance materials. Cure of an epoxy resin is normally achieved by two package systems based on the incorporation into the resin of active amine containing compounds or carboxylic acid anhydrides. These systems require thorough mixing of the ingredients; in addition, cure time can be several hours.

Another catalyst which can be used to cure epoxy resins as "one package" systems is based on a Lewis Acid catalyst in the form of an amine complex, such as boron trifluoride-monoethyl amine. The Lewis Acid is released on heating; cure takes place within 1 to 8 hours and can require a temperature of 160° C. and higher.

As shown by Schlesinger, U.S. Pat. No. 3,708,296, certain photosensitive aromatic diazonium salts can be employed to cure epoxy resins. When photolyzed, these aromatic dazonium salts are capable of releasing, in situ, a Lewis Acid catalyst which can initiate the rapid polymerization of the epoxy resin. However, even though these one package epoxy resin mixtures can provide fast curing compositions, a stabilizer must be used to minimize cure in the dark during storage of these mixtures. Despite these measures, gellation of the mixture can occur even in the absence of light. In addition, nitrogen is released during UV cure, which can result in film imperfections. Diazonium salts are generally thermally unstable, rendering the use of such materials hazardous because of the possibility of run-away decomposition.

As further shown by Crivello, U.S. Pat. No. 4,069,055 and U.S. Pat. No. 4,058,401, radiation induced polymerization of epoxides can also be achieved by the use of certain radiation sensitive onium salts of Group Va and VIa elements, in particular various aromatic sulfonium salts. Among the most effective compounds for this purpose are salts of the triphenyl sulfonium cation containing anions that release Lewis Acid when the salts are photodecomposed. Examples of such salts are:

$(C_6H_5)_3S^+X^-$ where $X^- = BF_4^-$, $PF_6^-$, $AsF_6^-$, $SbF_6^-$, $SnCl_6^-$, $SbCl_6^-$, etc.

Sulfonium salts of this kind are well known in the literature and have been prepared by a variety of means. (See Pitt, U.S. Pat. No. 2,807,648; Knapczyk and McEwen, J. Am. Chem. Soc., 91, 145 (1969); Goethals and Radzitzky, Bull. Soc. Chim. Belg. 73 546 (1964). The complex sulfonium salts can be prepared from the corresponding simple salts, such as the halide salts, by metathesis with a metal or ammonium salt of the complex anion desired. All of these methods have the disadvantage that the sulfonium salt has to be isolated from an aqueous reaction mixture and dried and then redissolved into the material in which it is to be used as a photocatalyst. Since these salts are not readily soluble in many epoxy resin formulations, this process is undesirable in practice.

The present invention is based on the discovery that the readily available triphenyl sulfonium halides can be reacted under atmospheric conditions in a solution consisting of a mixture of a polyol and a lactone with alkali metal or ammonium salts containing appropriate complex anions to yield, after filtration of the halide salt, a homogeneous solution of the active triphenyl sulfonium salt of the complex anion which is photochemically active and readily mixes the epoxy resin formulations. Appropriate complex anions are well known in the art and include, but are not limited to, $BF_4^-$, $PF_6^-$, $AsF_6^-$, $SbF_6^-$, $FeCl_4^-$, $SnCl_6^-$, $SbCl_6^-$, $BiCl_5^{--}$, $AlF_6^{---}$, $GaCl_4^-$, $InF_4^-$, $TiF_6^{--}$, $ZrF_6^{--}$ and the like. In a preferred embodiment of this invention, triphenyl sulfonium chloride dissolved in propylene glycol is reacted with potassium tetrafluoroborate or potassium hexafluorophosphate, and then γ-butyrolactone is added to yield, after removal of the KCl, a clear, homogeneous solution that has photocatalytic properties.

Although the examples herein use propylene glycol in forming the photocatalytic solution, any polyol containing at least two hydroxy groups including triols, e.g., 1,2,3-propanetriol, tetrols, etc., are operable.

Lactones operable herein include those which are stable and are readily synthesized. Thus, lactones of the formula:

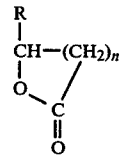

wherein R is H or $CH_3$ and n is 2 to 4 are operable herein. Specific examples include, but are not limited to, γ-valerolactone, γ-butyrolactone and δ-valerolactone.

The reactive solutions of this invention can be incorporated into a wide variety of epoxy formulations to render them photocurable.

The term "epoxy resin" as utilized in the description of the curable compositions of the present invention, includes any monomeric, dimeric, oligomeric or polymeric epoxy material containing one or a plurality of epoxy functional groups. For example, those resins which result from the reaction of bisphenol-A (4,4'-isopropylidene-diphenol) and epichlorohydrin, or by the reaction of low molecular weight phenol-formaldehyde resins (Novolak resins) which epichlorohydrin, can be used alone or in combination with an epoxy containing compound as a reactive diluent. Such reactive diluents as phenyl glycidyl ether, 4-vinylcyclohexene dioxide, limonene dioxide 1,2-cycloyexane oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane resins, epoxy-polyurethanes and epoxypolyesters. Further examples of epoxy resins which can be used are shown in Encyclopedia of Polymer Science and Technology, Vol. 6, 1967, Interscience Publishers, New York, pp 209-271, incorporated herein by reference.

The curable compositions of the present invention can be made by blending the epoxy resin, which herein-after will signify epoxy monomer, epoxy prepolymer, epoxy polymer or mixture thereof, with an effective amount of the sulfonium complex salt solution. The resulting curable composition, which can have a viscosity of from 1 centipoise to 100,000 centipoises at 25° C., can be applied to a variety of substrates by conventional means and cured to the tack-free state within 0.1 sec. or less to 10 minutes or more.

The proportion of sulfonium complex salt contained in the final formulation to epoxy resin can vary widely inasmuch as the salt is substantially inert, unless activated. Effective results can be achieved if a proportion of from 0.1% to 10% by weight of sulfonium salt is employed, based on the weight of curable composition. Higher or lower amounts can be used, however, depending upon factors such as the nature of epoxy resin, intensity of radiation cure time desired, etc.

The compositions to be cured, i.e., (converted to solid coatings) in accord with the present invention, are ordinarily transparent or translucent but may, if desired, include such additives as antioxidants, accelerators, dyes, inhibitors, activators, fillers, pigments, antistatic agents, flame-retardant agents, thickeners, thixotropic agents, surface active agents, viscosity modifiers, extending oils, plasticizers, tackifiers and the like within the scope of this invention. Such additives are usually preblended with the epoxides prior to or during the compounding step. Operable fillers include natural and synthetic resins, carbon black, glass fibers, wood flour, mica flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide, sand and the like. The aforesaid additives may be present in quantities up to 500 parts per 100 parts of the epoxy compositions by weight and preferably 0.005–300 parts on the same basis.

The preferred means of curing is by means of electromagnetic radiation of wavelength about 2,000–7,000 A. Such radiation can be obtained by the use of high or medium pressure mercury lamps, xenon lamps, mercury xenon lamps, lasers, etc. Lamps may be long arc or short arc, water or air cooled. The lamps can include envelopes capable of transmitting light of a wavelength of from about 1,849 A to 4,000 A and preferably 2,400 A to 4,000 A. The lamp envelope can consist of quartz, such as Spectrocil or of Pyrex, etc. Typical lamps which can be employed for providing ultraviolet radiation are, for example, medium pressure mercury arcs, such as the GE H3T7 arc and the Hanovia 200 w/inch arc lamp. The cures may be carried out with a combination of various lamps.

Although the preferred means of curing is by means of electromagnetic radiation of wavelength of about 2,000–7,000 A (because of simplicity, economy and convenience), the epoxy composition of the instant invention can be cured also by high energy ionizing irradiation. A preferred feature of the ionizing irradiation operation of the instant invention is treatment with high energy particle irradiation or by gamma-rays or X-rays. Irradiation employing particles in the instant invention includes the use of positive ions (i.e., protons, alpha particles and deuterons and also electrons or neutrons). The charged particles may be accelerated to high speeds by means of various voltage gradient mechanisms such as a Van de Graaff generator, a cyclotron, a Cockroft Walton accelerator, a resonant cavity accelerator, a betatron, a G. E. resonant transformer, a synchroton or the like.

In practicing the instant invention, the weight ratio of the triphenyl sulfonium halide:polyol:lactone can vary considerably. A weight ratio of triphenyl sulfonium halide:polyol:lactone in the range 1:1 to 5:1 to 20, respectively, is operable. Greater amounts of lactone can be used if desired, but excesses are generally avoided due to the possibility of lessening the desired physical characteristics of the subsequently cured epoxy resin.

The following examples are set out to explain, but expressly not limit, the instant invention. Unless otherwise noted, all parts and percentages are by weight.

EXAMPLE 1

To a 100 ml beaker equipped with stirrer and containing 10 parts of a commercially available 50% propylene glycol solution of triphenyl sulfonium chloride was added 3.1 parts of finely ground potassium hexafluorophosphate and 25 parts of $\gamma$-butyrolactone. The reaction mixture was agitated by stirring at room temperature. Within one half hour a homogeneous solution was obtained after removal of the KCl salt by filtration. This solution contained 18.5% by weight of triphenylsulfonium hexafluorophosphate.

EXAMPLE 2

To a 100 ml beaker equipped with stirrer and containing 10 parts of a commercially available 50% propylene glycol solution of triphenyl sulfonium chloride was added 3.54 parts of finely ground sodium hexafluoroarsenate and 35 parts of $\gamma$-butyrolactone. The reaction mixture was agitated by stirring at room temperature. Within one half hour a homogeneous solution was obtained after removal of the NaCl salt by filtration. This solution contained 15.9% by weight of triphenylsulfonium hexafluoroarsenate.

EXAMPLE 3

To a 100 ml beaker equipped with stirrer and containing 10 parts of a commercially available 50% propylene glycol solution of triphenyl sulfonium chloride was added 4.32 parts of finely ground sodium hexafluoroantimonate and 35 parts of $\gamma$-butyrolactone. The reaction mixture was agitated by stirring at room temperature. Within one half hour a homogeneous solution was obtained after removal of the NaCl salt by filtration. This solution contained 17.3% by weight of triphenylsulfonium hexafluoroantimonate.

EXAMPLE 4

To a 100 ml beaker equipped with stirrer and containing 10 parts of a commercially available 50% propylene glycol solution of triphenyl sulfonium chloride was added 2.72 parts of finely ground ammonium hexafluorophosphate and 35 parts of $\gamma$-butyrolactone. The reaction mixture was agitated by stirring at room temperature. Within one half hour a homogeneous solution was obtained after removal of the $NH_4Cl$ salt by filtration. The solution contained 14.6% of triphenylsulfonium hexafluorophosphate.

EXAMPLE 5

10% of the catalyst solution obtained in Example 1 was formulated with 90% of an epoxy blend having the following composition:

| | |
|---|---|
| (3,4-epoxycyclohexyl)methyl 3,4-epoxycyclohexanecarboxylate | 60 parts |
| Diglycidyl ether of Bisphenol A (epoxy equivalent 185) | 14 parts |
| 1,4-Butanediol diglycidyl ether | 5 parts |
| Silicone Oil (DC-190; Dow Corning) | 0.75 parts |
| Fluorohydrocarbon surfactant (FC-430; 3 M Co.) | 0.25 parts |

A portion of the above curable composition was spread by a hand roller in a thin film of less than 0.0012 cm over a steel plate and exposed to ultra-violet light in a UV curing unit. This curing unit consists of two medium pressure mercury lamps (200 watts/in) separated 28 cm apart and seated 8 cm above a conveyor belt on which the coated plate was placed. The coating was given a 0.9 second exposure per pass through the UV unit at a conveyor speed of 30.5 meters/min. An adherent, tack-free coating was obtained in one pass through the UV unit.

EXAMPLE 6

85 parts of (3,4-epoxycyclohexyl)methyl 3,4-epoxycyclohexanecarboxylate was mixed with 15 parts of the photocatalytic solution obtained in Example 2. Following the curing procedure of Example 5 a tack-free adherent film was formed in less than 1 second.

EXAMPLE 7

85 parts of (3,4-epoxycyclohexyl)methyl 3,4-epoxycyclohexanecarboxylate was mixed with 15 parts of the photocatalytic solution obtained in Example 3. Following the curing procedure of Example 5 a tack-free adherent film was formed in less than 1 second.

EXAMPLE 8

85 parts of (3,4-epoxycyclohexyl)methyl 3,4-epoxycyclohexanecarboxylate was mixed with 15 parts of the photocatalytic solution obtained in Example 4. Following the curing procedure of Example 5 a tack-free adherent film was formed in less than 1 second.

The following examples show the operability of the photocatalytic solutions in curing acrylate and methacrylate terminated monomers and epoxides:

EXAMPLE 9

70 parts of (3,4-epoxycyclohexyl)methyl 3,4-epoxycyclohexanecarboxylate was mixed with 15 parts of diethylene glycol diacrylate and 15 parts of the photocatalytic solution from Example 2. Following the curing procedure of Example 5 a tack-free adherent film was formed in less than 1 second on the steel plate.

EXAMPLE 10

70 parts of (3,4-epoxycyclohexyl)methyl 3,4-epoxycyclohexanecarboxylate was mixed with 15 parts of diethylene glycol diacrylate and 15 parts of the photocatalytic solution from Example 3. Following the curing procedure of Example 5 a tack-free adherent film was formed in less than 1 second on the steel plate.

EXAMPLE 11

70 parts of (3,4-epoxycyclohexyl)methyl 3,4-epoxycyclohexanecarboxylate was mixed with 15 parts of diethylene glycol dimethacrylate and 15 parts of the photocatalytic solution from Example 2. Following the curing procedure of Example 5 a tack-free adherent film was formed in less than 2 seconds on the steel plate.

EXAMPLE 12

70 parts of (3,4-epoxycyclohexyl)methyl 3,4-epoxycyclohexanecarboxylate was mixed with 15 parts of diethylene glycol dimethacrylate and 15 parts of the photocatalytic solution from Example 3. Following the curing procedure of Example 5 a tack-free adherent film was formed in less than 1 second on the steel plate.

We claim:

1. A photocurable composition comprising an epoxy resin selected from the group consisting of monomeric, dimeric, oligomeric and polymeric epoxy resin containing at least one epoxy group and a catalytic amount of a photocatalytic solution of a sulfonium salt of a complex anion, capable of yielding a Lewis acid when irradiated by UV light formed by reacting a sulfonium halide with an alkali metal or ammonium salt of a complex anion in a solvent mixture containing a polyol containing at least two OH groups and a lactone of the formula:

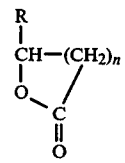

wherein R is H or CH₃ and n is 2 to 4, the weight ratio of the sulfonium halide:polyol:lactone being in the range 1:1 to 5:1 to 20, respectively.

2. The composition, according to claim 1, wherein the sulfonium salt in the photocatalytic solution is present in an amount in the range 0.1 to 10% by weight of the epoxy resin.

3. The process of curing an epoxy resin which comprises admixing an epoxy resin selected from the group consisting of monomeric, dimeric, oligomeric and polymeric epoxy resin containing at least one epoxy group with a photocatalytic solution of a sulfonium salt of a complex anion, capable of yielding a Lewis Acid when irradiated by UV light formed by reacting a sulfonium halide with an alkali metal or ammonium salt of a complex anion in a solvent mixture containing a polyol containing at least two OH groups and a lactone of the formula:

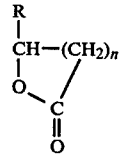

wherein R is H or CH₃ and n is 2 to 4, the weight ratio of the sulfonium halide:polyol:lactone being in the range 1:1 to 5:1 to 20, respectively, said solution being present in an amount sufficient to contain 0.1 to 10% by weight of the sulfonium salt based on the weight of the epoxy resin and thereafter exposing said admixture to radiation.

4. The process, according to claim 3, wherein the radiation is UV radiation.

5. The process, according to claim 3, wherein the radiation is high energy ionizing radiation.

6. The process of coating a substrate which comprises admixing an epoxy resin selected from the group consisting of monomeric, dimeric, oligomeric and polymeric epoxy resin containing at least one epoxy group with a photocatalytic solution of a sulfonium salt of a complex anion, capable of yielding a Lewis Acid when irradiated by UV light formed by reacting a sulfonium halide with an alkali metal or ammonium salt of a complex anion in a solvent mixture containing a polyol containing at least two OH groups and a lactone of the formula:

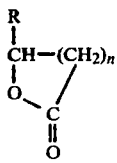

wherein R is H or $CH_3$ and n is 2 to 4, the weight ratio of the sulfonium halide:polyol:lactone being in the range 1:1 to 5:1 to 20, respectively, said solution being present in an amount sufficient to contain 0.1 to 10% by weight of the sulfonium salt based on the weight of the epoxy resin, coating said admixture on the substrate and thereafter exposing said admixture to radiation.

7. The process, according to claim 6, wherein the radiation is UV radiation.

8. The process, according to claim 6, wherein the radiation is high energy ionizing radiation.

9. The composition of claim 1 wherein the sodium salt is triphenylsulfonium hexafluorophosphate.

10. The process according to claim 2 wherein the sulfonium salt is triphenylsulfonium hexafluorophosphate.

11. The process according to claim 3 wherein the sulfonium salt is triphenylsulfonium hexafluorophosphate.

* * * * *